United States Patent [19]

Nguyen

[11] Patent Number: 5,460,698
[45] Date of Patent: Oct. 24, 1995

[54] ANTIFOAM COMPOSITION FOR AQUEOUS SYSTEMS

[75] Inventor: Duy T. Nguyen, Jacksonville, Fla.

[73] Assignee: Betz Laboratories, Inc., Trevose, Pa.

[21] Appl. No.: 332,281

[22] Filed: Oct. 31, 1994

Related U.S. Application Data

[63] Continuation-in-part of Ser. No. 125,998, Sep. 23, 1993, abandoned.

[51] Int. Cl.$^6$ .................................................. D21H 21/12
[52] U.S. Cl. ............................................. 162/158; 162/179
[58] Field of Search .............................. 162/75, 76, 158, 162/179; 252/358, 32

[56] References Cited

U.S. PATENT DOCUMENTS

| | | | |
|---|---|---|---|
| 3,705,860 | 12/1972 | Duvall | 252/358 |
| 3,723,342 | 3/1973 | Shane et al. | 252/358 |
| 3,935,121 | 1/1976 | Lieberman et al. | 252/321 |
| 3,959,175 | 5/1976 | Smith, Jr. et al. | 252/321 |
| 4,009,119 | 2/1977 | Poschmann et al. | 252/358 |
| 4,151,101 | 4/1979 | Anzenberger, Sr. et al. | 252/49.6 |
| 4,221,600 | 9/1980 | Alexander | 106/123 |
| 4,340,500 | 8/1982 | Boylan | 252/321 |
| 4,391,722 | 7/1983 | Schwartz et al. | 252/73 |
| 4,445,971 | 5/1984 | Lappi et al. | 162/158 |
| 4,451,390 | 5/1984 | Flannigan | 252/321 |
| 4,477,370 | 10/1984 | Kavchok et al. | 252/321 |
| 4,540,511 | 9/1985 | McCaffrey et al. | 252/321 |
| 4,950,420 | 8/1990 | Svarz | 252/321 |
| 4,983,316 | 1/1991 | Starch | 252/174.15 |
| 5,045,232 | 9/1991 | Dahanayake | 252/321 |
| 5,229,033 | 7/1993 | Nguyen et al. | 252/358 |

*Primary Examiner*—Peter Chin
*Attorney, Agent, or Firm*—Alexander D. Ricci; Matthew W. Smith

[57] ABSTRACT

A method for inhibiting the formation of foam in a papermaking system by adding a foam control composition consisting of a) either a polyoxyethylene-polyoxypropylene fatty alcohol or polyoxyethylene-polyoxypropylene difatty acid and b) oleic diethanolamide.

6 Claims, 6 Drawing Sheets

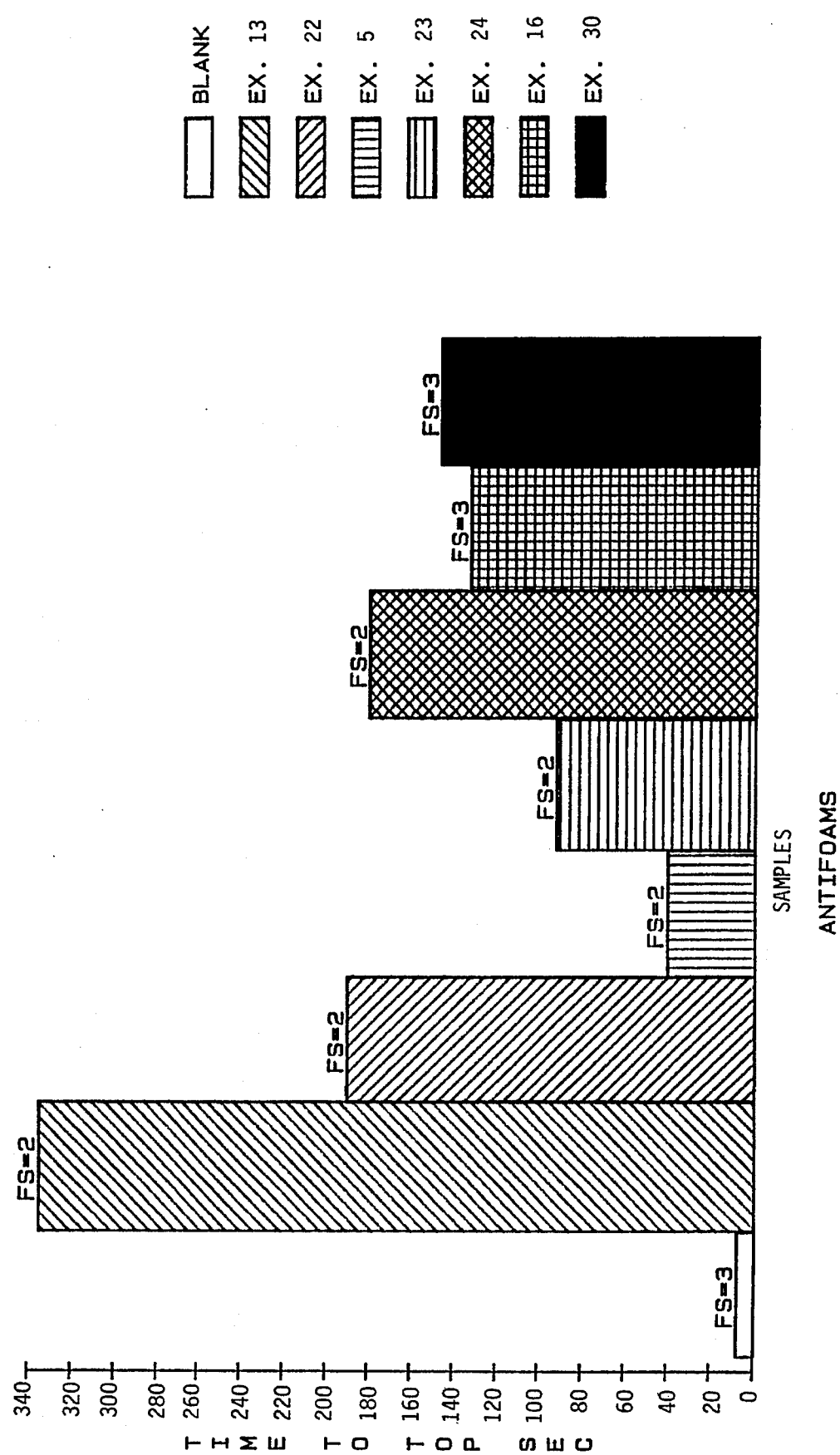

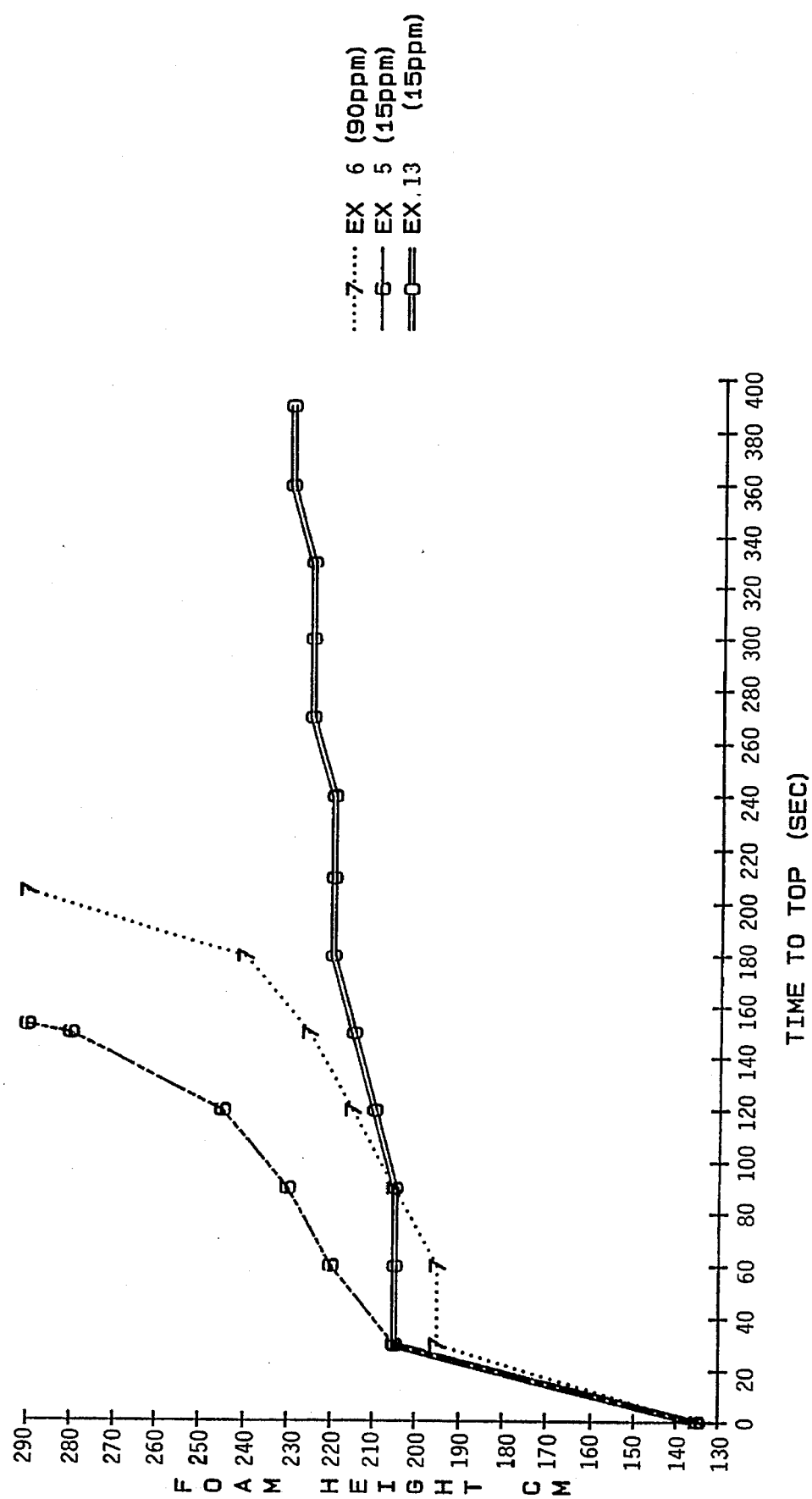

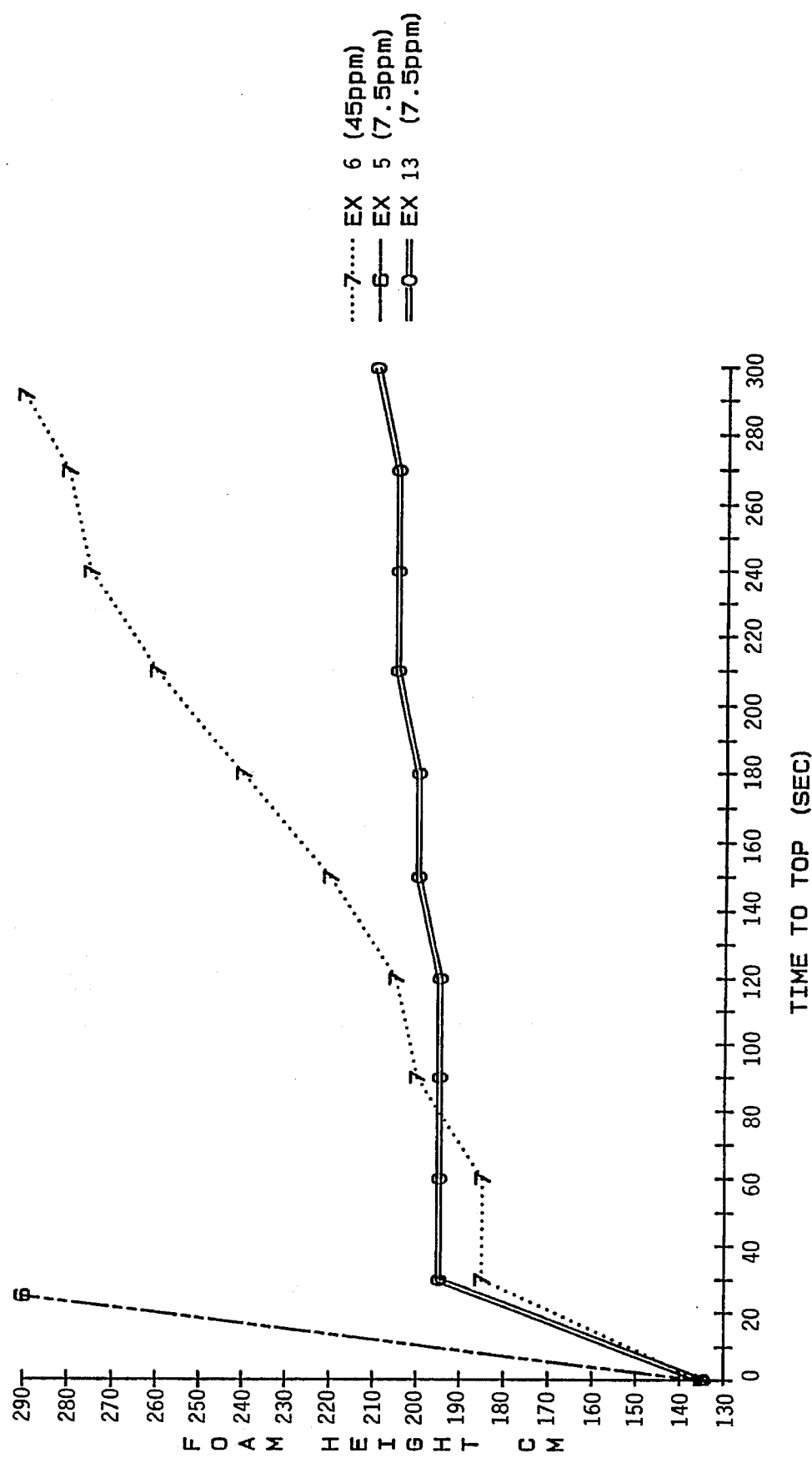

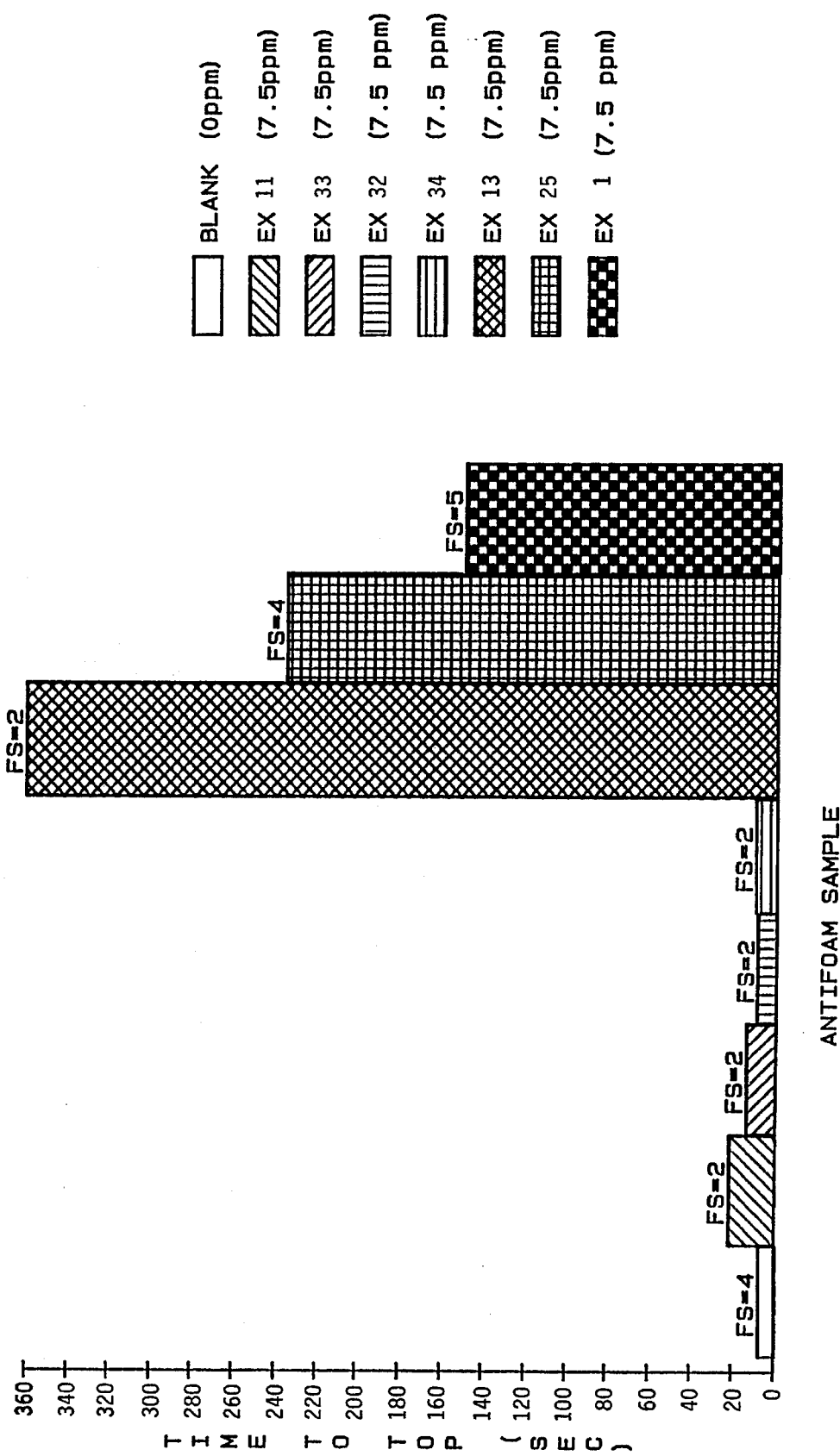

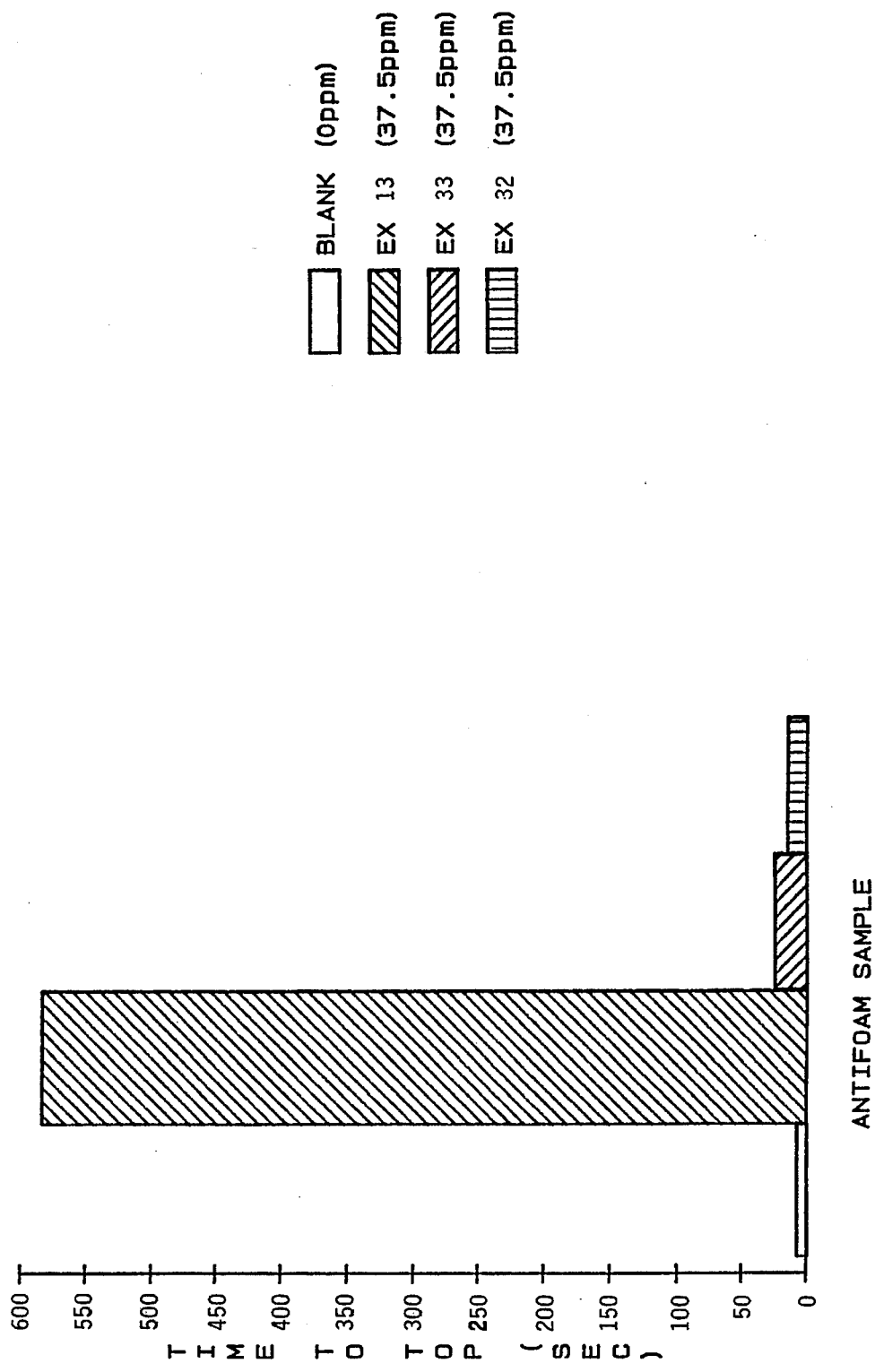

5,460,698

ANTIFOAM COMPOSITION FOR AQUEOUS SYSTEMS

This application is a continuation-in-part of Ser. No. 08/125,998, filed Sep. 23, 1993, now abandoned.

FIELD OF THE INVENTION

The present invention relates to foam control compositions, their preparation and use in aqueous systems. These foam control compositions are particularly effective in pulp and paper processing and in the treatment of effluent water.

BACKGROUND OF THE INVENTION

The persistence of foam in various aqueous industrial operations can cause process inefficiency and, in some cases, an inferior final product. The pulp and paper industry experiences some of the most troublesome foam problems. Common incessant foaming occurs in pulp washing and screening and papermaking processes. Stable foam also often surfaces during effluent wastewater treatment. Entrained air tends to be a more serious type foam. The spherical entrained air bubbles are finely dispersed in the bulk solution. Small bubble volumes tend to lack a sufficient buoyant force and thus often become attached to non-wettable fiber parts. These fibers and fines can flocculate to the surface and form dense stable foam. As a result, the stabilized bubbles can inhibit the drainage of washing liquor through the fiber mat which in turn slows down production. Entrained air is also known to impair paper formation and tensile strength.

Surface foam, on the other hand, is a more visible problem which can be evident in wire pits, stock chests and effluent ponds. The existence of surface foam surely indicates an entrained air problem. On the paper machine, collapsed surface foam can be carried back through the headbox and into the sheet where holes can be formed. On the deckers, mat filtration can be reduced when surface foam is picked up by the mat. Wastewater foaming can be hazardous to both the environment and man. In extreme cases, severe static foam can be blown across roads, thus creating traffic hazards and an unattractive mess.

Foam can be controlled by a variety of chemical methods. An effective antifoam should be slightly insoluble, yet dispersible, in the foaming medium. The antifoam should be able to control both entrained air and surface foam over a prolonged period of time. This present antifoam invention was developed to prevent or control the above described foaming problems while avoiding creating any undesirable side effects in the system or on the paper machines.

GENERAL DESCRIPTION OF THE INVENTION

The present invention provides an antifoam/defoamer composition comprising a combination of a) polyoxyethylene (EO)—polyoxypropylene (PO) fatty alcohol and/or polyoxyethylene (EO)—polyoxypropylene (PO) di-fatty acid having a melting point lower than 20° C. and b) oleic diethanolamide. This composition can be formulated at room temperature with no heating and cooling required. This defoaming mixture proves more effective in reducing and controlling both surface foam and entrained air than individual components or other conventional defoamers. The beneficial defoaming effects are more evident at lower temperatures, especially systems operating in the 20° C.–55° C. range such as deinked recycled tissue effluent treatment and acid/alkaline fine paper system.

DESCRIPTION OF RELATED ART

Many conventional foam control compositions embody fatty acid or fatty alcohol-based particulate emulsions to achieve a degree of water insolubility and hence defoaming effects. Some examples are set forth in U.S. Pat. No. 4,009,119 (Poschman et al.), U.S. Pat. No. 4,340,500 (Boylan), U.S. Pat. No. 4,221,600 (Alexander), U.S. Pat. No. 4,451,390 (Flannigan), and U.S. Pat. No. 4,477,370 (Kavchok et al.). Compositions as such comprise a hydrophobic dispersion of, for example, solid fatty alcohol of 14–28 carbon atoms, requiring the process steps of heating the material to at least 60° C., followed by cooling to ambient temperatures. The result is an efficacious product which contains defoaming particulates which are prone to undesirable deposition throughout the papermaking process. Furthermore, the shelf-life stability of these products is very poor. Due to the relatively low percent actives of these compositions the costs of transportation, storage and use tend to be uneconomical.

Another class of particulate defoamer agents encompasses the use of hydrocarbon oils, silicone oils, high melting point amides, paraffinic waxes, and hydrophobic silicas. Examples of various combinations of such are U.S. Pat. No. 3,705,860 (Duvall), U.S. Pat. No. 3,723,342 (Shane et al.), U.S. Pat. No. 3,935,121 (Lieberman et al.), U.S. Pat. No. 3,959,175 (Smith, Jr. et al.), U.S. Pat. No. 4,983,316 (Starch), and U.S. Pat. No. 5,045,232 (Dahanayake). Again, it is noted that the presence of such high melt point surfactants and silica particulates is critical for the primary functionality of said products. Defoaming effects can be achieved at the expense of impacting paper sheet properties and causing felt and machine deposition. The Dahanayake patent necessitates the use of a hydrophobic silica and propoxylated and ethoxylated $C_6$ to $C_{10}$ and $C_{12}$ to $C_{14}$ alkanols to provide static foam collapse.

Lappi et al. describes a defoaming agent which comprises EO/PO fatty alcohols and EO/PO nonylphenols for use in paper manufacturing (U.S. Pat. No. 4,445,971). Svarz (U.S. Pat. No. 4,950,420) describes an antifoam composition comprising a polyether surfactant and a polyhydric alcohol fatty acid ester for use in papermaking processes. These defoamers have several drawbacks. Firstly, they have limited water solubility and dispersability so that large amounts of these antifoams must be fed and even then, the defoaming is relatively low. Secondly, the spreading coefficients of these compounds are small which requires large amounts of antifoam to control the foam. Lastly these compounds are not water dilutable, and hence overfeeding is inevitable. Not only can overfeeding lead to excessive chemical costs but it also can cause adverse effects such as sizing, deposition.

U.S. Pat. Nos. 4,151,101 and 4,391,722 and 4,540,511 reveal the use of fatty acid alkanolamide with an alcohol, monocarboxylic acid and/or dimethyl silicon fluid as an antifoam for use in non-aqueous systems such as phosphoric acid synthesis or hydraulic fluid.

U.S. Pat. No. 5,229,033 reveals the use of polybutene with nonionic surfactants such as oleic diethanolamide and PEG ester. This mixture is especially efficacious for fine paper systems where the temperature is moderately high (i.e., 110° F.–135° F.). The product becomes ineffective in tissue and effluent media where temperatures usually are from 78°–95° F.

The present invention achieves excellent defoaming effects while addressing the negative effects caused by the previously mentioned antifoams. The present defoamer is formulated as a water dilutable concentrate of ingredients and also can be blended at room temperature with no heating or cooling required. The composition will not deposit on felts or machines nor cause adverse effects on paper sheet properties as could occur with silicon oils, high melt point particulates, and silicas.

BRIEF DESCRIPTION OF THE DRAWINGS

The accompanying drawings which are incorporated in and form a part of the specification illustrate the embodiments of the present invention and, together with the description, serve to explain the principles of the invention. In the drawings:

FIG. 1 is a bar chart illustrating the time in seconds foams of recycled deinked tissue medium processing waters containing antifoam compositions took to reach the top of a test container;

FIG. 2 is a bar chart illustrating the time in seconds foam of recycled deinked tissue medium processing waters containing antifoam compounds took to reach the top of a container;

FIG. 3 is a plot of foam height in centimeters versus time in seconds for a synthetic alkaline white water containing antifoam compounds;

FIG. 4 is a plot of foam height in centimeters versus time in seconds for a synthetic alkaline white water containing antifoam compounds;

FIG. 5 is a bar chart illustrating the time in seconds foams of synthetic tissue medium containing antifoam compounds took to reach the top of a container; and FIG. 6 is a bar chart illustrating the time in seconds foams of recycled deinked tissue medium processing waters containing antifoam compounds took to reach the top of a container.

DETAILED DESCRIPTION OF THE INVENTION

In accordance with the present invention, the antifoam properties of EO/PO fatty alcohols and EO/PO difatty acid are considerably enhanced by combining them with an oleic diethanol amide. A water dilutable concentrate can be obtained by adding a small amount of PEG 400 DO, soybean oil and/or tridecyl alcohol. The resulting emulsion is stable for weeks.

The polyoxyethylene-polyoxypropylene fatty alcohols used in this invention have the structure:

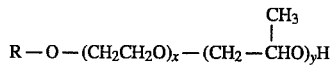

where R is a linear or branched alkyl having from 12 to 18 carbon atoms (preferably a $C_{14}$–$C_{16}$ mixture); $x=2$ to 20; $y=1$ to 40.

The EO/PO fatty alcohols should have a cloud point of at least 16° C., preferably 20°–25° C., have a molecular weight of 1200 to 3000, and possess a melting point less than 20° C.

The polyoxyethylene-polyoxypropylene difatty acids should have a molecular weight of 1000 to 4000, a melting point below 20° C. and have the following structure:

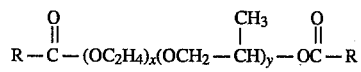

where R is a linear or branched unsaturated alkyl having from 12 to 18 carbon atoms (preferably $C_{18}$); $x=1$ to 10; $y=1$ to 35 moles.

The oleic diethanolamide used in this invention has the structure:

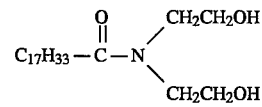

The foam control compositions of this invention are useful in controlling foam in aqueous systems, particularly fine paper, tissue and waste water systems where temperatures range from 75° F. to 130° F.

The weight ratio of a) oleic diethanol amide to b) EO/PO fatty alcohol and/or EO/PO difatty acid, a:b, is about 1:99 to about 15:85, preferably from about 5:95 to about 10:90. This mixture can be mixed with small amounts of PEG 400 DO (up to 15%), soybean oil or aliphatic hydrocarbon (up to 30%) and tridecyl alcohol 1:9 (up to 10%) to obtain a water dilutable concentrate. In some instances, as will be shown later, these additives also increase antifoam performance. Unlike other conventional antifoams, this composition can be made down with water and thus overfeeding can be prevented. The foam control compositions of this invention are added to aqueous systems in an amount effective to produce concentrations of the foam control compositions in an aqueous solution of from about 1 ppm to about 5000 ppm by weight.

A preferred foam control composition of this invention comprises 47% EO/PO $C_{14}$ $C_{16}$ fatty alcohol, 3% oleicdiethanolamide, 10% tridecyl alcohol, 30% soybean oil and 10% PEG 400 DO by weight.

The foam control compositions of this invention are especially formulated to inhibit the formation of foam over an extended period of time and to reduce existing foam within a short period of time.

The composition can be made simply by mixing the ingredients thoroughly at ambient (or room) temperature.

EXAMPLES

To illustrate the efficacy of the invention, a variety of pulp and paper processing waters (e.g., fine paper machine white water and tissue medium) are used as foaming media.

In evaluating the antifoam efficacy, the medium is circulated from a calibrated reservoir (0–295 cm) via a pump and is returned back to the reservoir. This action agitates the medium, which in turn causes foam. The medium temperature can be held approximately constant with a temperature controller and heat coil wrapped around the bottom cell reservoir. A known amount of the defoamer to be treated is introduced into the test cell before the pump is turned on. The foam levels are then recorded every 30 seconds until the foam reaches the maximum level (290 cm). At this point, the pump is turned off and the test time is recorded. The stability of the column of foam is also observed and is ranked on a scale of 1–5 (1=very unstable, 5=very stable). Ideally the more desirable efficacious antifoam should possess a higher time to top and a foam stability of 1.

Synthetic Media Formulations

A. Synthetic Alkaline White Water

| | |
|---|---|
| 18 liter | DI $H_2O$ |
| 54.0 g | $CaCO_3$ |
| 2.16 g | $Al_2(SO_4)_3$-12-14$H_2O$ |
| 2.16 g | Rosin |
| 0.90 g | NaCl |
| 0.27 g | $MgSO_4$ |
| 16.20 g | $Na_2SO_4$ |
| 1.44 g | $Na_2SiO_3.5H_2O$ |
| 1.44 g | $CaCl_2.2H_2$ |
| 36.00 g | Microcrystalline Cellulose |
| 4.50 g | Formaldehyde (37%) |
| 1.08 g | AKD |
| 72.00 g | 5% Starch Solution |

B. Synthetic Recycle Deinked Tissue Medium

| | |
|---|---|
| 18 liter | DI $H_2O$ |
| 4.572 g | $Na_2SiO_3.5H_2O$ |
| 0.144 | $MgSO_4$ |
| 6.984 g | $CaCl_2.2H_2O$ |
| 4.680 g | $CaCO_3$ |
| 9.162 g | $Na_2SO_4$ |
| n 1 | Surfonic N-95 (n = 150, 200) or DI2000-82 Surfactant (EO/PO block copolymer and EO fatty alcohol; n = 350) |
| 20 g | Kymene |

C. Synthetic Alkaline Fine Paper

| | |
|---|---|
| DI $H_2O$ | 74.18% |
| Tap $H_2O$ | 25.00% |
| AKD | 0.006% |
| 5% Starch | 0.4% |
| 3% Alum | 0.15% |
| 37% Formaldehyde | 0.025% |
| Cellulose | 0.17% |
| $CaCO_3$ | 0.06% |
| 5% Rosin | 0.25% |

The following ingredients, as the percentage by weight indicates, were mixed at room temperature unless otherwise stated.

Example 1

Oleic diethanolamide

Example 2

EO/PO dioleate

Example 3

A blend of polyether surfactant and polyhydric alcohol fatty acid ester (U.S. Pat. No. 4,950,420).

Example 4

Ethoxylated adol ether alcohol

Example 5 (U.S. Pat. No. 5,229,033)

Polybutene
PEG 600 DO
PEG 400 DO

Example 6

15% active water-based defoamer containing fatty alcohol as particles.

Example 7

PEG 600 DO

Example 8

10% Oleic Diethanolamide (Example 1)
90% EO/PO dioleate (Example 2)

Example 9

20% Oleic Diethanolamide (Example 1)
80% EO/PO dioleate (Example 2)

Example 10 (U.S. Pat. No. 4,445,971)

EO/PO $C_{16}$ $C_{18}$ alcohol

Example 11 (U.S. Pat. No. 4,445,971)

EO/PO $C_{14}$ $C_{16}$ alcohol

Example 12

5% oleic diethanolamide (Example 1)
25% aliphatic hydrocarbon
70% EO/PO $C_{14}$ $C_{16}$ fatty alcohol (Example 11)

Example 13

47% EO/PO $C_{14}$ $C_{16}$ fatty alcohol (Example 11)
3% oleic diethanolamide (Example 1)
10% tridecyl alcohol
30% soybean oil
10% PEG 400 DO Example 14

10% tridecyl alcohol
3% oleic diethanolamide (Example 1)
30% soybean oil
57% EO/PO $C_{14}$ $C_{16}$ fatty alcohol (Example 11)

Example 15

3% oleic diethanolamide (Example 1)
10% PEG 400 DO
87% EO/PO $C_{14}$ $C_{16}$ fatty alcohol (Example 11)

Example 16

Oil-based defoamer containing PEG esters and $C_{14}$ $C_{16}$ saturated fatty alcohol.

Example 17

Mineral Oil
PEG ester

Example 18

Oil-based defoamer containing PEG esters and stearic acid.

Example 19

EBS Defoamer

Example 20

Silica Defoamer

Example 21

EO Dioleate

Example 22 (U.S. Pat. No. 4,445,971)

EO/PO alkyl phenol

Example 23

Water-based defoamer containing EO/PO block copolymer, glycol ester and propylene glycol.

Example 24

Water-based defoamer containing ethoxylated material, organic ester and water.

Example 25

PEG 400 DO

Example 26

Ethoxylated triglyceride

Example 27

Water-based defoamer containing organic esters, silicon oil and hydrocarbon wax.

Example 28

30% soybean oil
3% oleic diethanolamine
67% Example 11

Example 29

L-61 dioleate

Example 30

Adol ether alcohol, Pluronic block copolymer, PEG ester

Example 31

EO/PO Block Copolymer (i.e., Pluronic)

TABLE I

Defoamer Efficacy Results Tested in Synthetic
Alkaline Fine Paper
(pH = 7.3, Temperature = 125° F.)

| Composition of | ppm | Time in Seconds to Overflow i.e., Time Required for Foam to Exceed 290 cm |
|---|---|---|
| Blank (Control) | — | 15 |
| Example 1 | 1.5 | 20 |
| Example 2 | 1.5 | 178 |
| Example 3 | 1.5 | 164 |
| Example 4 | 1.5 | 37 |
| Example 5 | 1.5 | 171 |
| Example 6 | 1.5 | 126 |
| Example 7 | 1.5 | 133 |
| Example 25 | 1.5 | 35 |
| Example 26 | 1.5 | 35 |
| Example 21 | 1.5 | 28 |
| Example 9 | 1.5 | 56 |
| Example 8 | 1.5 | 180 + @225 cm |

Table I shows the defoaming results tested in synthetic alkaline white water and it is evident that the antifoam of the present invention (Example 8) exhibits improved foam control characteristics as compared to each individual component (Examples 1, 2) and also outperforms conventional prior art defoamers. It's noteworthy that too much oleic diethanolamine (Example 9) reduces the performance.

Table II reveals the antifoaming results. The medium was obtained from a recycle deinked tissue mill (Northeast). The data in Table II clearly demonstrate that the defoamer compositions of the present invention (Examples 12, 28, 14, 13) work effectively as antifoaming agents. Same medium was used but tested at a higher temperature as shown in FIG. 1. The defoamer of the present invention (Example 13) clearly demonstrates the persistence (i.e., highest top time) and unstable surface foam (foam stability=2) during the processing of recycle deinked tissue furnish.

TABLE II

Defoamer Efficacy Results Tested in
Recycle Deinked Tissue Mill (North East)
(pH = 7.6, Temperature = 78°)

| Composition of | ppm | Time in Seconds to Overflow i.e., Time Required for Foam to Exceed 290 cm |
|---|---|---|
| Blank (Control) | — | 8 |
| Example 10 | 7.5 | 26 |
| Example 12 | 7.5 | 538 |
| Example 11 | 7.5 | 26 |
| Example 28 | 7.5 | 522 |
| Example 22 | 7.5 | 144 |
| Example 14 | 7.5 | 375 |
| Example 5 | 7.5 | 7 |
| Example 1 | 7.5 | 8 |
| Example 13 | 7.5 | 420 |

Antifoam efficacy was also tested in 100% recycle deinked tissue medium received from a Southern tissue mill. The results are depicted in FIG. 2. As should be apparent from FIG. 2, the present invention (Example 13) shows an exceptional antifoaming performance (i.e., high top time, low foam stability) when compared to other conventional defoamers (e.g., silica, EBS, fatty alcohol, etc.).

The medium used for testing Examples 13 and 31 was obtained on-site from a virgin tissue mill located in a southern state and the results are shown in Table III. Again, it is evident that the defoaming composition of the present invention (Example 13) is superior to a conventional EO/PO block copolymer defoamer (Example 31).

TABLE III

Defoamer Efficacy in
Virgin Tissue Medium (Southern State)

| Composition of | ppm | Time in Seconds to Overflow i.e., Time Required for Foam to Exceed 290 cm |
|---|---|---|
| Example 13 | 7.5 | 631 |
| Example 31 | 7.5 | 19 |

Further testing was also done in synthetic tissue medium (FIG. 3) and in synthetic alkaline white water (FIG. 4). The results of these figures show the comparative substantivity properties of the composition of Example 13 as compared with the typical water-based defoamer containing fatty alcohol (Example 6) and polybutene-based product (Example 5).

As mentioned previously, U.S. Pat. Nos. 4,151,101, 4,391,722 and 4,540,511 disclose the use of dialkanolamide and/or monoalkanolamide with an alcohol, carboxylic acid, and dimethyl silicon fluid as an antifoaming agent for use in non-aqueous systems. The following defoaming compositions were formulated according to U.S. Pat. Nos. 4,151,101 and 4,540,511.

Example 32 (U.S. Pat. No. 4,151,101)

67% dimethyl siloxane
33% oleic diethanolamide

Example 33 (U.S. Pat. No. 4,540,511)

80% fatty acid
15% coconut monoethanolamide
5% $C_{13}$ alcohol

Example 34 (U.S. Pat. No. 4,540,511)

80% fatty acid
15% oleic diethanolamide
5% $C_{13}$ alcohol

These examples are then compared to the present invention (Example 13). The results are shown in FIGS. 5 and 6. It is evident that the composition according to the present invention (Example 13) exhibits improved foam control characteristics when compared to examples taken from the convention art (Examples 32, 33 and 34). Furthermore, unlike our novel composition (Example 13), defoaming composition taken from U.S. Pat. No. 4,151,101 separated shortly (i.e., 20 minutes) at ambient. It can also be seen from FIG. 5 that the defoaming composition disclosed in this invention demonstrates a synergistic effect (i.e., comparing Example 13 with Examples 25 and 20).

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What I claim is:

1. A method for inhibiting the formulation of foam in a papermaking system comprising adding to the aqueous pulp from about 1 ppm to about 5000 ppm of a composition comprising:
   (a) oleic diethanolamide, and
   (b) at least one compound selected from the group consisting of polyoxyethylene-polyoxypropylene fatty alcohols having the structure:

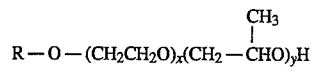

where R is a linear or branched alkyl of from 12 to 18 carbon atoms, x is 2 to 20 and y is 1 to 40, and polyoxyethylene-polyoxypropylene difatty acids having the structure:

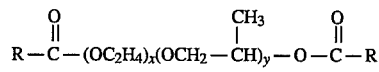

where R is a linear or branched unsaturated alkyl having from 12 to 18 carbon atoms x is 1 to 10 and y is 1 to 35, wherein the weight ratio of a:b is from 1:99 to 15:85 and wherein said composition is polybutene free.

2. The method of claim 1 further comprising a compound selected from the group consisting of polyethylene glycol, soybean oil, aliphatic hydrocarbon and tridecyl alcohol.

3. The method of claim 1 wherein the weight ratio of a:b is from 5:95 to 10:90.

4. The method of claim 1 wherein the papermaking system comprises fine paper or tissue paper.

5. The method of claim 4 wherein the papermaking system has a temperature range of from 75° F. to 130° F.

6. The method of claim 2 wherein said composition comprises 47% EO/PO $C_{14}$ $C_{16}$ fatty alcohol, 3% oleic diethanolamide, 10% tridecyl alcohol, 30% soybean oil and 10% PEG 400 DO by weight.

* * * * *